(12) United States Patent
Wang et al.

(10) Patent No.: US 11,512,734 B2
(45) Date of Patent: Nov. 29, 2022

(54) SHAFT-TUBE JOINT STRUCTURE OF CARBON FIBER REINFORCED PLASTIC DRIVE SHAFT

(71) Applicant: Jilin University, Changchun (CN)

(72) Inventors: Dengfeng Wang, Changchun (CN); Shenhua Li, Changchun (CN); Ke Xu, Changchun (CN)

(73) Assignee: Jilin University, Changchun (CN)

( * ) Notice: Subject to any disclaimer, the term of this patent is extended or adjusted under 35 U.S.C. 154(b) by 289 days.

(21) Appl. No.: 16/892,521

(22) Filed: Jun. 4, 2020

(65) Prior Publication Data

US 2020/0386264 A1 Dec. 10, 2020

(30) Foreign Application Priority Data

Jun. 6, 2019 (CN) .......................... 201910489110.1

(51) Int. Cl.
*F16C 3/02* (2006.01)
*F16D 3/16* (2006.01)
(Continued)

(52) U.S. Cl.
CPC .............. *F16C 3/026* (2013.01); *F16C 11/06* (2013.01); *F16C 33/16* (2013.01); *F16D 3/18* (2013.01);
(Continued)

(58) Field of Classification Search
CPC ...... F16C 3/026; F16C 11/06; F16C 2208/02; F16C 2226/40; F16C 2226/76;
(Continued)

(56) References Cited

U.S. PATENT DOCUMENTS 4,289,557 A * 9/1981 Stanwood ............... B29C 70/86
156/173
4,663,819 A * 5/1987 Traylor ................... F16C 3/026
464/181
(Continued)

FOREIGN PATENT DOCUMENTS

CN 105333021 A 2/2016
CN 205226113 U 5/2016
(Continued)

*Primary Examiner* — Phillip A Johnson
(74) *Attorney, Agent, or Firm* — Dorsey & Whitney LLP

(57) ABSTRACT

The present invention discloses a shaft-tube joint structure of a carbon fiber reinforced plastic (CFRP) drive shaft. The shaft-tube joint structure includes a hollow shaft tube, a plurality of first rectangular teeth being uniformly and circumferentially arranged at both ends of the hollow shaft tube; two shaft-tube joints which are respectively fixed at two ends of the hollow shaft tube, the thickness of the shaft-tube joint being smaller than that of the hollow shaft tube, and an inner wall of the shaft-tube joint being smoothly connected to an inner wall of the hollow shaft tube; and a universal joint, an end thereof being tubular, a plurality of second rectangular teeth being uniformly and circumferentially arranged, the universal joint being matched with and sleeving the outer wall of the shaft-tube joint, and the second rectangular teeth being meshed with the first rectangular teeth.

10 Claims, 4 Drawing Sheets

(51) Int. Cl.
*F16C 11/06* (2006.01)
*F16D 3/18* (2006.01)
*F16C 33/16* (2006.01)

(52) U.S. Cl.
CPC ...... *F16C 2208/02* (2013.01); *F16C 2226/40* (2013.01); *F16C 2240/60* (2013.01); *F16C 2240/70* (2013.01); *F16C 2326/06* (2013.01)

(58) Field of Classification Search
CPC .............. F16C 2226/80; F16C 2240/60; F16C 2240/70; F16C 2326/06; F16D 3/16; F16D 3/185; F16D 3/387; F16D 3/18
See application file for complete search history.

(56) References Cited

U.S. PATENT DOCUMENTS

| | | | | |
|---|---|---|---|---|
| 4,792,320 A | * | 12/1988 | Nickel | .................... F16C 3/026 464/181 |
| 4,853,060 A | * | 8/1989 | Nickel | .................... F16D 3/387 156/172 |
| 4,930,204 A | * | 6/1990 | Schurter | ............. B29C 37/0085 29/469.5 |

FOREIGN PATENT DOCUMENTS

| | | | | | |
|---|---|---|---|---|---|
| EP | 29093 A | * | 5/1981 | ............. | B29C 70/86 |
| JP | H0968214 A | * | 3/1997 | | |
| JP | 2000120649 A | * | 4/2000 | | |

\* cited by examiner

SHAFT-TUBE JOINT STRUCTURE OF CARBON FIBER REINFORCED PLASTIC DRIVE SHAFT

TECHNICAL FIELD

The present invention relates to the field of automobile tube axles and joints, and in particular, to a shaft-tube joint structure of a carbon fiber reinforced plastic (CFRP) drive shaft.

BACKGROUND

A drive shaft is an essential component in a power transmission system of a front-engine rear-wheel-drive car. During the power transmission process, the drive shaft needs to bear the required torsional load. Due to the self-weight and dynamic vibration load of the drive shaft, it must also bear a certain bending load. Therefore, the stiffness, strength and fatigue life of the drive shaft have an important impact on the service performance of the whole vehicle. Research data from the International Aluminum Institute shows that when the weight of the whole vehicle is reduced by 10%, the fuel efficiency can be improved by 6%-8%. The drive shaft is a rotating part on the vehicle, and the energy saving and emission reduction effect achieved by its lightweight structure is more significant than that brought by weight reduction of moving parts on the vehicle. Therefore, lightweight design of the drive shaft has important engineering application value.

At present, the automobile drive shaft is formed by welding a steel tube with a certain diameter and wall thickness to universal joint forks with equal diameters at both ends of the steel tube. Due to the high density of steel, the drive shaft has a large weight, which increases oil consumption and emission; at the same time, an impact load of an automobile transmission system is also increased, and the service lives of components of the automobile transmission system are shortened. Therefore, the design and development of a novel drive shaft with high-strength and light CFRP is of great significance for realizing energy saving and emission reduction of automobiles. However, the universal joint forks at both ends of the drive shaft and a sliding spline used for slightly changing the length of the drive shaft are difficult to manufacture with CFRP, and the original metal material needs to be kept unchanged. Only an intermediate shaft section of the drive shaft can be replaced with a CFRP shaft tube to reduce the weight of the whole drive shaft. At the same time, dissimilar material connection between the CFRP shaft tube and the universal joint forks at both ends needs to be reliable, so that the CFRP drive shaft and the original steel drive shaft have the same strength, rigidity and fatigue life.

Chinese patent No. CN205226113U discloses a carbon fiber drive shaft assembly. Spline forks are installed at both ends of a carbon fiber shaft tube, respectively. The spline forks are inserted into the carbon fiber shaft tube coated with a glue layer. The spline forks are connected to the carbon fiber shaft tube in a gluing+interference fit mode. In this connection mode, thermal expansion coefficients of a CFRP and a spline fork material are different, so when the operating temperature of the drive shaft assembly changes greatly in winter and summer, a joint loosens due to different expansion and contraction deformations of the two materials. When a transmission torsion load is large, the CFRP shaft tube and a shaft head slide relatively or even fall off completely.

Chinese patent No. CN105333021A discloses a method for connecting a CFRP drive shaft with a metal flange by a Z-pin. A transition part Z-pin sleeve is added at the joint of a CFRP drive shaft and a metal flange. The CFRP drive shaft and the Z-pin sleeve are formed into a whole through fiber winding and solidified together. In the working process of the CFRP drive shaft, the drive shaft transfers a load to the Z-pin sleeve, and the Z-pin sleeve transfers the load to the metal flange through the pin. This connection mode can realize the reliable connection between the carbon fiber drive shaft and the metal flange, but it has the disadvantages of complex structure, many manufacturing procedures, complicated process and high cost.

SUMMARY

To overcome the shortcomings of the prior art, the present invention provides a shaft-tube joint structure of a CFRP drive shaft, which ensures that the drive shaft also has good bending and torsion resistance when transmitting large torque by reliably connecting dissimilar materials.

The present invention provides a shaft-tube joint structure of a CFRP drive shaft, including:

a CFRP hollow shaft tube, a plurality of first rectangular teeth being uniformly and circumferentially arranged at both ends of the hollow shaft tube;

two shaft-tube joints which are respectively fixed at two ends of the hollow shaft tube, the tube wall thickness of the shaft-tube joint being smaller than that of the hollow shaft tube, and an inner wall of the shaft-tube joint being smoothly connected to an inner wall of the hollow shaft tube; and a universal joint, an end thereof being tubular, a plurality of second rectangular teeth being uniformly and circumferentially arranged, the universal joint sleeving the outer wall of the shaft-tube joint, and the second rectangular teeth being meshed with the first rectangular teeth.

Preferably, the hollow shaft tube and the shaft-tube joint are both made of a CFRP, and carbon fibers are arranged at 45° to the axial direction of the hollow shaft tube.

Preferably, the hollow shaft tube has a length of 200-5000 mm, an inner diameter of 10-200 mm and an outer diameter of 15-300 mm; and an axial length of the shaft-tube joint is 5-100 mm.

Preferably, the rectangular teeth each have a thickness of 3-30 mm.

Preferably, the tube wall thickness of the shaft-tube joint is 20%-60% that of the hollow shaft tube.

Preferably, the universal joint is made of steel B480QZR.

Preferably, the universal joint is connected to the hollow shaft tube and the shaft-tube joint by structural adhesive.

Preferably, the hollow shaft tube and the shaft-tube joint are manufactured by a hot press curing molding process.

Preferably, there are at least two first rectangular teeth; and the each first rectangular teeth form a central angle of 360°/(number of first rectangular teeth*2)=90° in circumferential distribution on the hollow shaft tube.

Preferably, the other end of the universal joint is connected to a gearbox or a main reducer.

The present invention has the following beneficial effects. The present invention discloses a shaft-tube joint structure of a CFRP drive shaft. Rectangular teeth at an end of a CFRP drive shaft tube are meshed with rectangular teeth at ends of steel universal joint fork tubes at both ends of the drive shaft, thereby ensuring that the drive shaft also has good bearing performance when transmitting large torque. The CFRP drive shaft has excellent torsion and bending resistance in the working process through matched sleeving and gluing between the circumferential surface of the joint of the CFRP drive shaft tube and inner cavity surfaces of steel universal joint fork shaft tubes at both ends. The CFRP drive shaft in the present invention has a light weight and a simple structure, and its performance meets the use requirements. The joint structure according to the present invention realizes reliable dissimilar material connection between the CFRP shaft tube and the steel universal joint fork shaft tube, so that the carbon fiber, which is a novel material with high strength, light weight, good damping and vibration reduction and impact resistance performance, is applied to the shaft tube of the drive shaft. This greatly reduces the weight of the drive shaft, is beneficial to energy saving and emission reduction of automobiles, effectively reduces the vibration of automobiles and inertial impact loads in transmission systems, and improves the working reliability of automobiles.

DETAILED DESCRIPTION

The present invention is further described in detail below with reference to the accompanying drawings, so as to enable those skilled in the art to implement it with reference to the specification.

Figure 1:
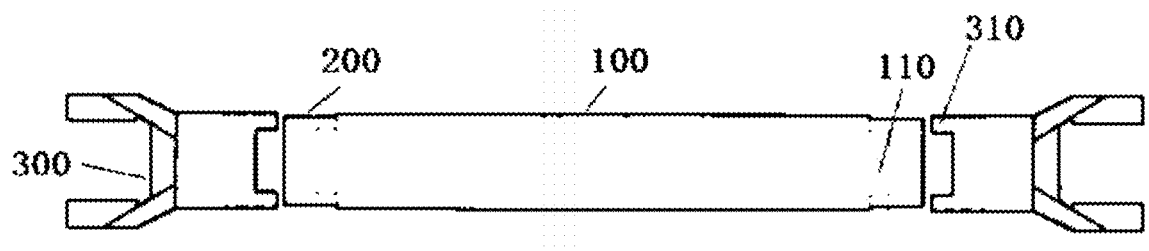
FIG. 1 is a two-dimensional structural diagram of a drive shaft according to the present invention.
Figure 2:
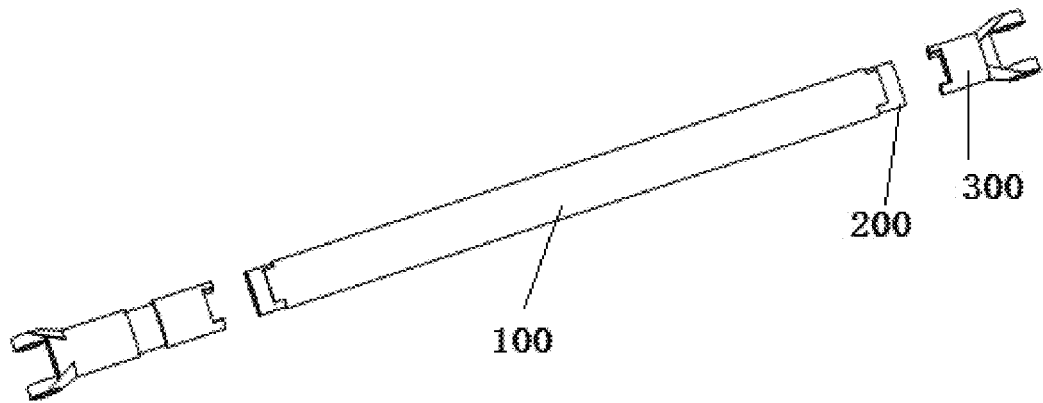
FIG. 2 is a three-dimensional structural diagram of a drive shaft tube and a joint according to the present invention.
Figure 3:
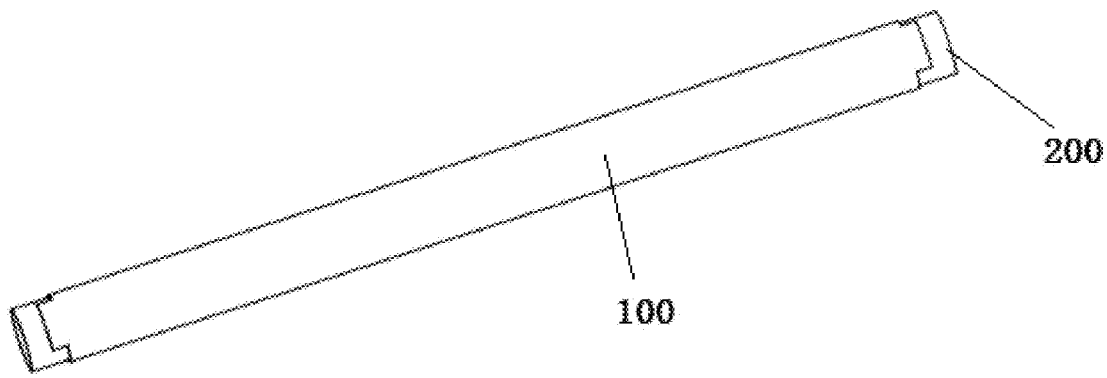
FIG. 3 is a three-dimensional structural diagram of a drive shaft according to the present invention.

As shown in FIGS. 1-3, a shaft-tube joint structure of a CFRP drive shaft according to the present invention mainly includes a shaft tube 100 which has a hollow structure, where a plurality of first rectangular teeth 110 are uniformly and circumferentially arranged at both ends of the hollow shaft tube, and the first rectangular teeth 110 extend to both ends in the axial direction of the hollow shaft tube 100. Two shaft-tube joints 200 are fixed at both ends of the hollow shaft tube 100 respectively, and are formed together with the hollow shaft tube 100. The thickness of the shaft-tube joint 200 is smaller than that of the hollow shaft tube 100, and an inner wall of the shaft-tube joint 200 is smoothly connected to an inner wall of the hollow shaft tube 100, so a boss is formed at the joint of an outer wall of the shaft-tube joint 200 and an outer wall of the hollow shaft tube 100. An end of a universal joint 300 is tubular, and a plurality of second rectangular teeth 310 are circumferentially arranged. The universal joint 300 is matched with and sleeves the outer wall of the shaft-tube joint 200, and the second rectangular teeth 310 are meshed with the first rectangular teeth 110.

In another example, the hollow shaft tube 100 and the shaft-tube joint 200 are both made of a CFRP, and carbon fibers are arranged at 0°, ±45° and 90° to the axial direction of the hollow shaft tube.

In another example, an axial length of the shaft-tube joint 200 is 5-100 mm.

In another example, the rectangular teeth each have a thickness of 3-30 mm.

In another example, the wall thickness of the shaft-tube joint 200 is 20%-60% that of the hollow shaft tube 100.

In another example, the universal joint 300 is made of steel B480QZR.

In another example, the universal joint 300 is connected to the hollow shaft tube 100 and the shaft-tube joint 200 by structural adhesive.

In another example, the hollow shaft tube 100 and the shaft-tube joint 200 are manufactured by a hot press curing molding process.

In another example, there are two first rectangular teeth 110, and the first rectangular teeth 110 form a central angle of 90° in circumferential distribution on the hollow shaft tube.

In another example, the other end of the universal joint 300 is connected to a gearbox or a main reducer.

In a specific preparation process, the structure relates to a nesting-meshing composite connection structure between a hollow shaft tube and steel universal joints at two ends. The nesting-meshing composite connection structure is formed by connecting a CFRP drive shaft-tube joint to the steel universal joints at two ends. The bending resistance and torsion resistance of the lightweight CFRP drive shaft-tube joint of the automobile are achieved, and the problem of poor bending and torsion resistance of the existing dissimilar material connection structure between the hollow shaft tube and the steel universal joints is solved. According to the requirement for the torque to be transmitted, first a CFRP drive shaft tube with a certain outer diameter and wall thickness is selected, and when the shaft tube is formed, carbon fibers are distributed at 0°, ±45° and 90° with the axis, so that the CFRP drive shaft tube bears greater torque. At both ends of the hollow shaft tube, the outer diameter wall thickness t is cut by a certain thickness (e.g., 40% t-80% t) to obtain a 5-100 mm thin tube section (namely the shaft-tube joint 200) by axial machining, then machining is performed at the ends to obtain 2-6 uniformly and circumferentially distributed first rectangular teeth 110, and the first rectangular teeth 110 each have a thickness of 3-30 mm With respect to the tubular structures of the steel universal joints 300 matched with the hollow shaft tube at both ends, the inner diameters are enlarged to be the same as the outer diameter and length of the CFRP shaft joint 200, so that the steel universal joints are matched and sleeved with the shaft-tube joint 200 of the drive shaft. Similarly, 2-6 uniformly and circumferentially distributed second rectangular teeth are obtained by machining at the outer ends of the tubular structures of the universal joints 300, so that the second rectangular teeth are meshed with the first rectangular teeth of the shaft tube of the drive shaft, and it is ensured that the universal joint fork at both ends are in the same plane. Then, the CFRP shaft-tube joint is connected to steel universal joints at both ends by structural adhesive, and a nesting-meshing composite connection structure is formed after curing to obtain the CFRP drive shaft. The joint connection structure can bear enough torque and resist a certain bending load, and can avoid joint failure caused by different thermal expansion coefficients of steel and CFRP when the use environment temperature changes.

In a specific example, it is determined that the CFRP shaft tube 100 is 1228 mm long, 79 mm in inner diameter and 89 mm in outer diameter, i.e., 5 mm in wall thickness, according to the transmitted torque and the space distance. The layer solution of the shaft tube is to lay 32 layers of CFRP One-way belt according to the sequence and angle in Table 1. The shaft tube is manufactured by a hot pressing curing molding process.

TABLE 1

Laying sequence and fiber arrangement direction of the hollow shaft tube

| Sequence number | Fiber angle | Sequence number | Fiber angle | Sequence number | Fiber angle | Sequence number | Fiber angle |
| --- | --- | --- | --- | --- | --- | --- | --- |
| 1 | 0° | 9 | 45° | 17 | 90° | 25 | −45° |
| 2 | 45° | 10 | −45° | 18 | −45° | 26 | 45° |
| 3 | −45° | 11 | 45° | 19 | 45° | 27 | 90° |
| 4 | 45° | 12 | −45° | 20 | 0° | 28 | −45° |
| 5 | −45° | 13 | 0° | 21 | −45° | 29 | 45° |
| 6 | 90° | 14 | 45° | 22 | 45° | 30 | −45° |
| 7 | 45° | 15 | −45° | 23 | −45° | 31 | 45° |
| 8 | −45° | 16 | 90 | 24 | 45° | 32 | 0° |

The outer walls of both ends of the hollow shaft tube 100 are radially thinned by 3 mm, and the thinned length is 50 mm from the end in the axial direction, but two symmetrically distributed first rectangular teeth are reserved, thus the shaft-tube joint 200 is obtained. The first rectangular teeth form an angle of 90° in circumferential distribution the shaft tube, and each has a thickness of 3 mm and a length of 20 mm. A dedendum angle and an addendum angle are rounded with a fillet radius of 2 mm to form a joint structure of the CFRP drive shaft.

An inner cavity material of the steel universal joint is cut, so that its diameter is the same as the outer diameter of the shaft-tube joint 200, and two second rectangular teeth which are uniformly and symmetrically distributed are obtained by cutting similarly. The second rectangular teeth form an angle of 90° in circumferential distribution, and each has a thickness of 3 mm and a length of 20 mm A dedendum angle and an addendum angle are rounded with a fillet radius of 2 mm.

The shaft-tube joints 200 at both ends of the hollow shaft tube 100 are ground, then the positions where the outer circumferential surfaces of the shaft-tube joints 200 and the end faces and side faces of the first rectangular teeth and the steel universal joint are nested with each other are coated with structural adhesive, and then the shaft-tube joints 200 are inserted in inner cavities of the steel universal joint and just nested with the inner cavities. Two first rectangular teeth on the hollow shaft tube 100 and splines of two second rectangular teeth on the universal joint are meshed with each other respectively to form a nesting-meshing composite connection structure of the CFRP drive shaft tube and the steel universal joint, thus obtaining the CFRP automobile drive shaft for automobile power transmission.

In order to further verify the performance effect of the shaft-tube joint structure of the drive shaft according to the present invention, laboratory performance tests are carried out:

Beneficial Effects of Light Weight:

Research by the International Aluminum Institute shows that for every 10% reduction in vehicle weight, fuel consumption can be reduced by 6%-8%, emissions can be reduced by 4%-6%, the 0-100 km acceleration capability of an automobile can be increased by 8%-10%, a braking distance can be shortened by 2-7 m, and the tire life can be increased by 7%. For every 100 kg reduction of automobile translation parts, 0.3-0.5 L of fuel can be saved per 100 km, and the carbon dioxide emission can be reduced by 800-1100 g. The energy-saving and emission-reducing effect of the drive shaft as an automobile rotating part is more obvious than that of the translation part by 6 times. The weight of the CFRP drive shaft of the present invention is 11.55 kg and is reduced by 9.66 kg compared with that of the steel drive shaft with the same structure, which is 21.21 kg. The CFRP drive shaft can save 0.174-0.290 L of oil and reduce carbon dioxide emission by 463.68-637.56 g as an automobile rotating part for every 100 km.

Figure 4:
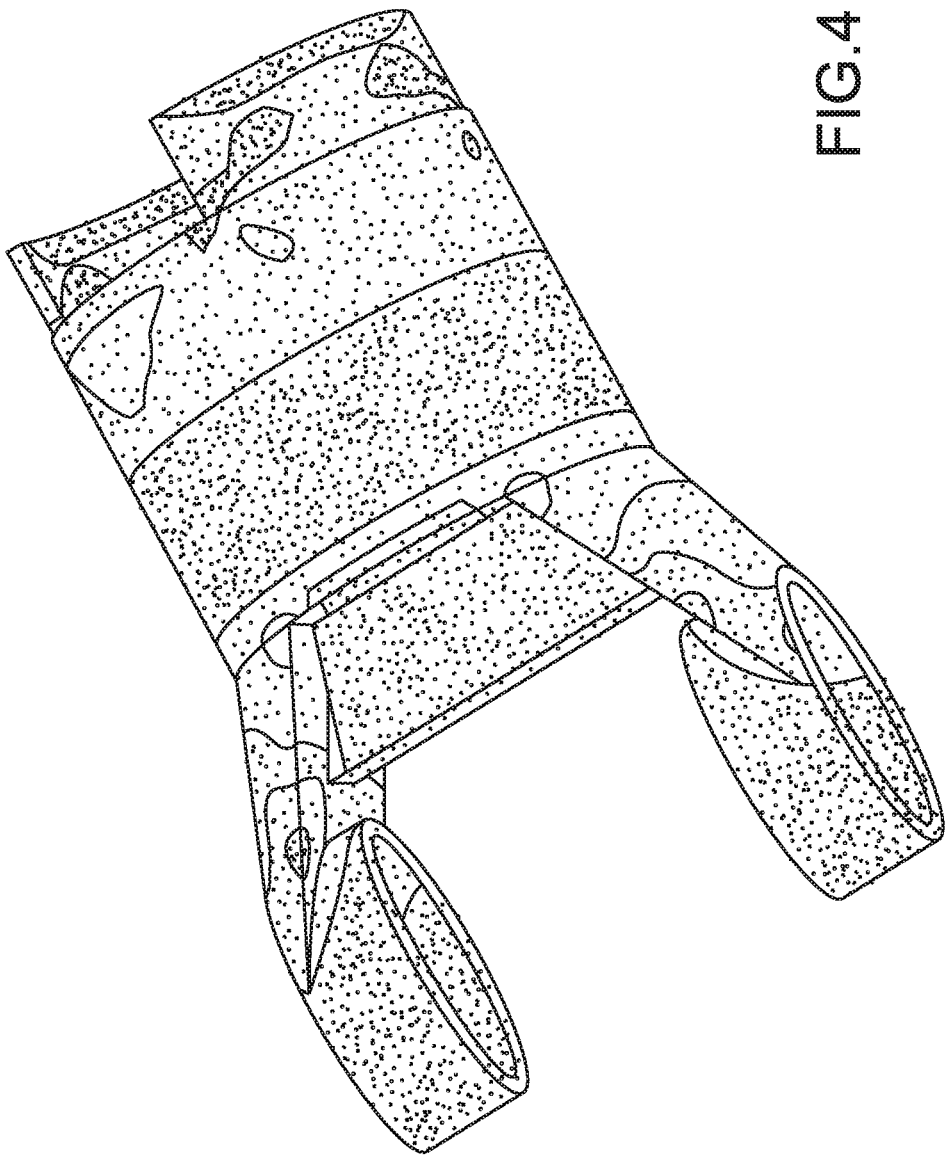
FIG. 4 shows a stress distribution value of a joint of a drive shaft under a rated working condition according to the present invention.

VonMises Stress Performance at the Joint:

As shown in FIG. 4, in the specific example, under the rated torque 7219 N·m of the CFRP drive shaft, the maximum vonMises stress simulation value $\sigma_{max}$ at the joint is equal to 236.1 MPa. Considering the safety factor of 1.5 according to the automotive industry standard QC/T29082-1992, it can be seen that $1.5\sigma_{max}$=354.15 Mpa is smaller than the yield stress of the universal joint fork material, i.e., the CFRP drive shaft of the present invention meets structural strength requirement.

Figure 5:
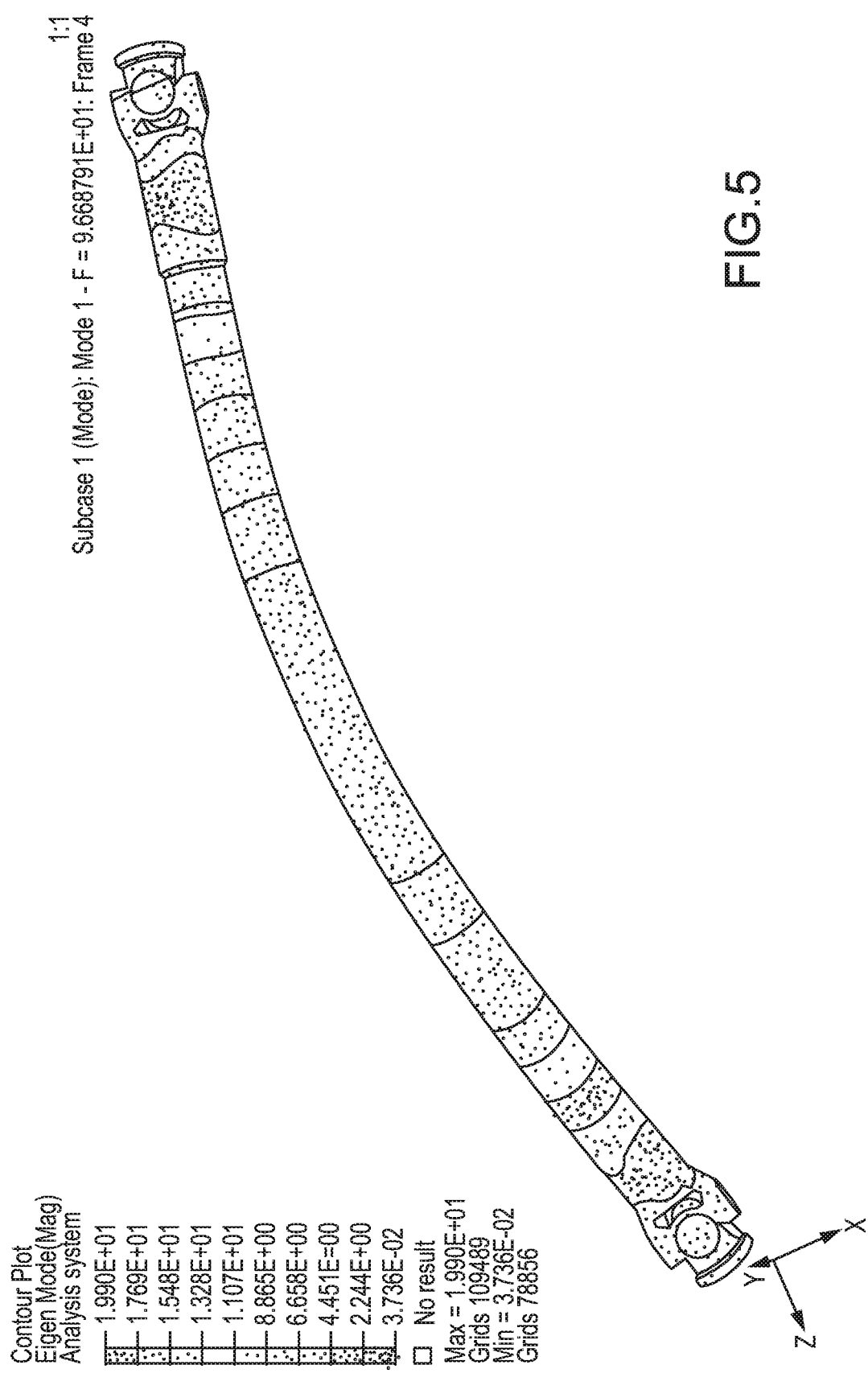
FIG. 5 shows a first-order modal shape and frequency of a drive shaft according to the present invention.

Modal Performance:

As shown in FIG. 5, in the specific example, the CFRP drive shaft is applied to an engine with a rated rotation speed of 2100 rpm, and its maximum rotation frequency is calculated as 44.7 Hz when the transmission ratio is 0.783. Modal analysis of the CFRP drive shaft shows that its first-order natural frequency is 96.7 Hz. Considering the safety factor of 0.7, 0.7*96.7 Hz=67.7 Hz>44.7 Hz, the first-order natural frequency of the drive shaft is much larger than its rotation frequency, that is, the drive shaft will not resonate and can rotate smoothly at the rated speed of the engine.

Figure 6:
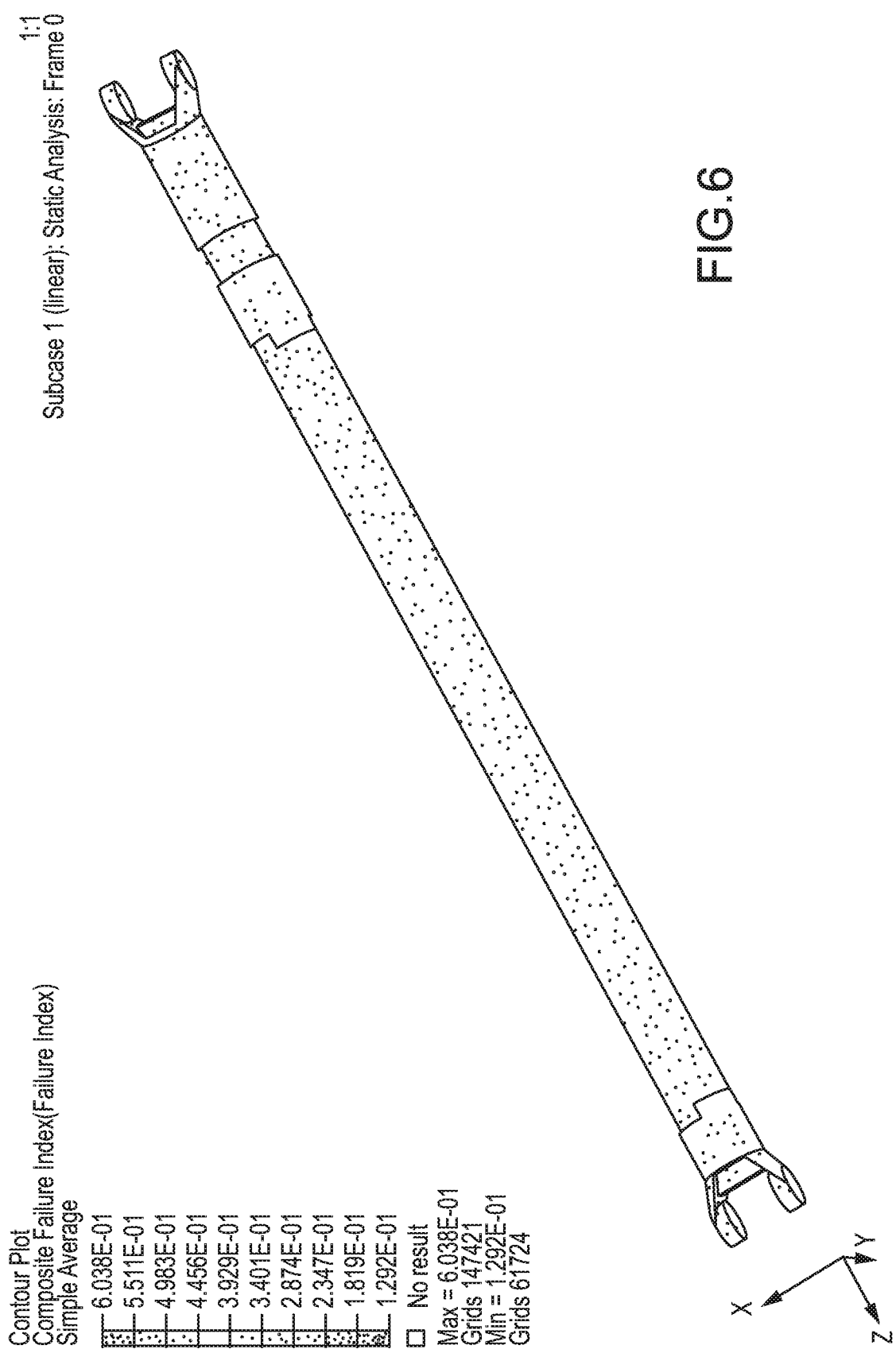
FIG. 6 is a failure index of a drive shaft tube according to the present invention.

Failure Index of the Composite Shaft Tube:

As shown in FIG. 6, the failure index of the CFRP shaft tube is subjected to simulation calculation in the specific example, and its maximum failure index is 0.6038, and the reliability reaches 0.999 when the safety factor of the CFRP is 1.6. Therefore, it is verified that 1.6×0.6038=0.966<1 (when the failure index of the composite is less than 1, it can be considered as being safe and reliable), i.e., the CFRP shaft tube of the present invention meets the performance requirements.

Although the implementation solution of the present invention has been disclosed above, it is not limited to the application listed in the specification and the implementation, it can be fully applied to various fields suitable for the present invention, and additional modifications can be easily implemented by those skilled in the art. Therefore, the present invention is not limited to the specific details and illustrations shown and described herein without departing from the general concept defined by the claims and the equivalent scope.

What is claimed is:

1. A shaft-tube joint structure of a carbon fiber reinforced plastic (CFRP) drive shaft, the shaft-tube joint structure comprising:
    a hollow shaft tube, a plurality of first rectangular teeth being uniformly and circumferentially arranged at both ends of the hollow shaft tube;
    two shaft-tube joints which are respectively fixed at two ends of the hollow shaft tube, a tube wall thickness of the shaft-tube joint being smaller than that of the hollow shaft tube, and an inner wall of the shaft-tube joint being connected to an inner wall of the hollow shaft tube; and a universal joint, an end of the universal joint being tubular, a plurality of second rectangular teeth being uniformly and circumferentially arranged, the universal joint sleeving the outer wall of the shaft-tube joint, and the second rectangular teeth being meshed with the first rectangular teeth.

2. The shaft-tube joint structure of the CFRP drive shaft according to claim 1, wherein the hollow shaft tube and the shaft-tube joint are both made of a CFRP, and carbon fibers are arranged at 0°, ±45° and 90° to an axial direction of the hollow shaft tube.

3. The shaft-tube joint structure of the CFRP drive shaft according to claim 2, wherein:
the hollow shaft tube has a length of 200-5000 mm, an inner diameter of 10-200 mm and an outer diameter of 15-300 mm; and
an axial length of the shaft-tube joint is 5-100 mm.

4. The shaft-tube joint structure of the CFRP drive shaft according to claim 3, wherein each of the rectangular teeth has a thickness of 3-30 mm.

5. The shaft-tube joint structure of the CFRP drive shaft according to claim 1, wherein the tube wall thickness of the shaft-tube joint is 20%-60% that of the hollow shaft tube.

6. The shaft-tube joint structure of the CFRP drive shaft according to claim 5, wherein the universal joint is made of steel B480QZR.

7. The shaft-tube joint structure of the CFRP drive shaft according to claim 6, wherein the universal joint is connected to the hollow shaft tube and the shaft-tube joint by structural adhesive.

8. The shaft-tube joint structure of the CFRP drive shaft according to claim 7, wherein the hollow shaft tube and the shaft-tube joint are manufactured by a hot press curing molding process.

9. The shaft-tube joint structure of the CFRP drive shaft according to claim 8, wherein:
there are at least two first rectangular teeth; and
each of the first rectangular teeth form a central angle of 360°/(number of first rectangular teeth*2) in circumferential distribution on the hollow shaft tube.

10. The shaft-tube joint structure of the CFRP drive shaft according to claim 1, wherein the other end of the universal joint is connected to a gearbox or a main reducer.

\* \* \* \* \*